Nov. 28, 1967 M. DRAZIC 3,355,660
RELAY CONTACT CHATTER DETECTOR HAVING CHATTER
RESPONSIVE FLIP-FLOPS
Filed Feb. 18, 1965
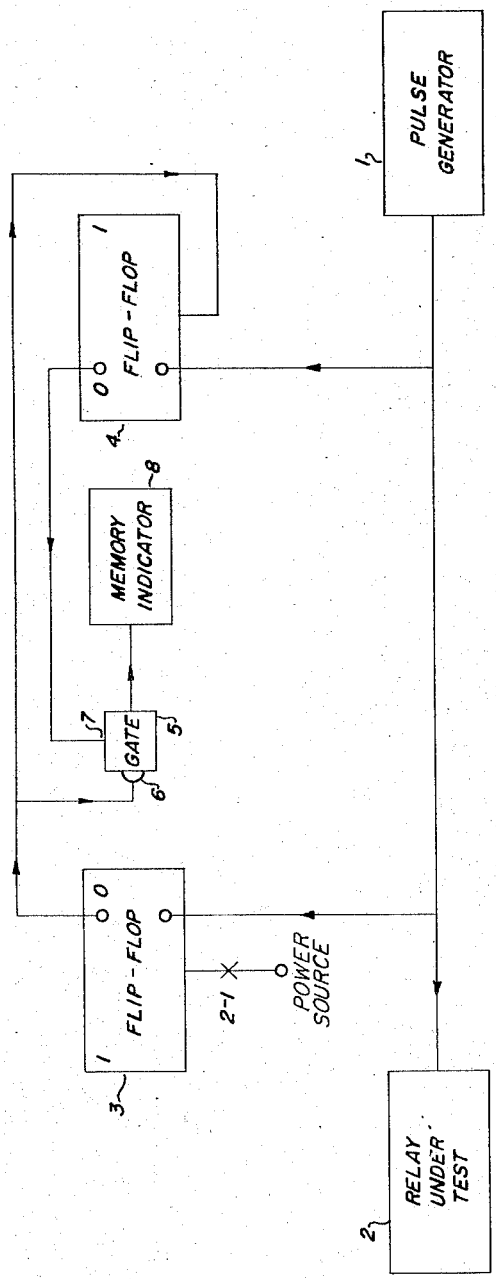
INVENTOR
MYLES DRAZIC
AGENT
Curphey & Erickson

United States Patent Office 3,355,660
Patented Nov. 28, 1967

3,355,660
RELAY CONTACT CHATTER DETECTOR HAVING CHATTER RESPONSIVE FLIP-FLOPS
Miles Drazic, Pierrefonds, Quebec, Canada, assignor to Northern Electric Company Limited, Montreal, Quebec, Canada
Filed Feb. 18, 1965, Ser. No. 433,683
3 Claims. (Cl. 324—28)

ABSTRACT OF THE DISCLOSURE

The testing apparatus comprises two interconnected flip flops which are reset to a first conductive state before each test. The input of the first flip flop is connected to a power source through the contacts of a relay under test. Upon the first closure of the relay contacts the first flip flop is switched from its first conductive state to a second conductive state and, upon the second closure of the relay contacts in case of chatter, the first flip flop is switched back to its first conductive state. The second flip flop is connected to the output of the first flip flop and is responsive to the output of the first flip flop, while in its second conductive state, for switching from its first to its second conductive state. A normally closed gate is connected to the output of each flip flop and is adapted to become conductive upon switching of the first flip flop back to its first conductive state while the second flip flop remains in its second conductive state. Opening of the gate causes energization of a memory indicator which gives a permanent indication that the contacts have chattered.

---

This application relates to an apparatus for testing electrical contact devices for possible chattering.

The present invention consists in an apparatus for examining a pulse generated by the contacts of an electromechanical relay under varying test conditions such as the effect caused by the operate and release currents or by the accelerating and decelerating forces exerted by a moving vehicle.

Various systems have been proposed for testing electrical contact devices as, for example, the system disclosed in U.S. Patent 2,432,944 issued to H. R. Shillington on Dec. 16, 1947. In accordance with the teaching of the Shillington patent, a testing apparatus is provided having an oscillograph in which the electron beam is deflected at a frequency corresponding to the frequency of make and break of an electrical contact device under test and the deflection of the beam along one axis is modified in accordance with the conditions of the various contacts to product persistent visual patterns individual to the conditions being tested for. However this arrangement is too elaborate for use on production lines and furthermore requires a skilled operator.

It is therefore the object of the invention to provide an apparatus for quickly and reliably indicating the occurrence to contact chattering, this apparatus being basically a production tool which does not require a skill operator.

In accordance with the invention the testing apparatus comprises two interconnected flip-flops which have been initially reset to a first conductive state. The first flip-flop is electrically connected to the electrical contacts for alternation from the first to a second conductive state in response to a first operation of the contacts and back to the first state in response to a second operation or chatter of the contacts. The second flip-flop is connected for alternation from the first to the second conductive state upon conditioning of the first flip-flop into its second state only. A normally closed gate is connected to each of the flip flops and is adapted to become conductive upon operation of the first flip-flop back into its first state in response to the second operation of the contacts. Opening of the gate causes energization of a memory indicator which gives a permanent indication that the contacts have chattered.

The invention may be better understood by referring to the drawing illustrating a block diagram of a preferred embodiment of the invention.

The flip-flops used in this system are of a conventional bistable type having two stable conducting sections. A signal from an outside source is required to change the conductive state from one section of the flip-flop to the other. The remaining components are also conventional and need not be described in detail.

A pulse generator 1 sends a pulse to a relay 2 under test, and simultaneously to two flip-flops 3 and 4. For the purpose of our description the two conducting sections of flip-flops 3 and 4 have been identified "1" and "0." Flip-flop 3 is in a zero conductive state when its right section is not conducting. Similarly flip-flop 4 is in a zero conductive state when its left section is not conducting. The pulse from generator 1 resets flip-flops 3 and 4 to their zero conductive state. The pulse applied to the electromagnetic winding of relay 2 operates contacts 2–1 to apply a pulse to flip-flop 3 to change the conductive state of flip-flop 3 from the zero conductive state to the mark conductive state.

An output from the right section of flip-flop 3 is applied to terminal 6 of normally closed gate 5. It is also applied to flip-flop 4 to change the conductive state from zero to mark. The mark output from the left section of flip-flop 4 is applied to terminal 7 of gate 5. Normally closed gate 5 has a characteristic such that it will conduct only when no signal is applied to its terminal 6 while a signal is applied to its terminal 7. It can be seen therefore that in the case of a chatter free pulse, signals will be applied to both terminals 6 and 7 thus preventing gate 5 from conducting. Therefore memory indicator 8 connected to the output of gate 5 will not not be energized. On the following pulse of the pulse generator 1 the above sequence will repeat itself.

If on the other hand the contacts of relay 2 should chatter once causing subsequent opening and reclosing of contacts 2–1, flip-flop 3 will see an additional pulse and will consequently return to its zero conductive state. The second flip-flop however will not be operated since it does not receive an input from the first flip-flop and will consequently remain in its mark conductive state. Gate 5 will therefore have no input at its terminal 6 but will receive an input at its terminal 7. It will then conduct and energize memory indicator 8 which will give a permanent indication that the contacts have chattered. Memory indicator 8 has a manual reset.

It is to be understood that the invention is not limited to testing of electromagnetic relays. It may be used for testing mechanical relays. In such a case the relay will be operated by means other than the pulse generator.

What is claimed is:

1. An apparatus for testing for chattering the contacts of a relay comprising:
    (a) a first flip flop;
    (b) energizing means connected to the input of the first flip flop through the relay contacts, said first flip flop being responsive to a first operation of the relay contacts for changing from a first conductive state to a second conductive state, and being responsive to a second operation of the relay contacts when chattering occurs for changing back to its first conductive state;
    (c) a second flip flop responsive to the output of the first flip flop, while in its second conductive state, for changing from a first conductive state to a second conductive state;

(d) a normally closed gate connected to the output of each flip flop and adapted to become conductive upon operation of the first flip flop back to its first conductive state while the second flip flop remains in its second state; and (e) means connected to said gate and responsive to conduction of the gate for indicating chattering of the contacts.

2. An apparatus as defined in claim 1 including means for resetting said first and second flip-flops to their first conductive state before each test.

3. An apparatus as defined in claim 1 wherein said indicating means is a memory indicator.

No references cited.

RUDOLPH V. ROLINEC, *Primary Examiner.*

WALTER L. CARLSON, *Examiner.*

E. L. STOLARUN, *Assistant Examiner.*